Patented May 23, 1950

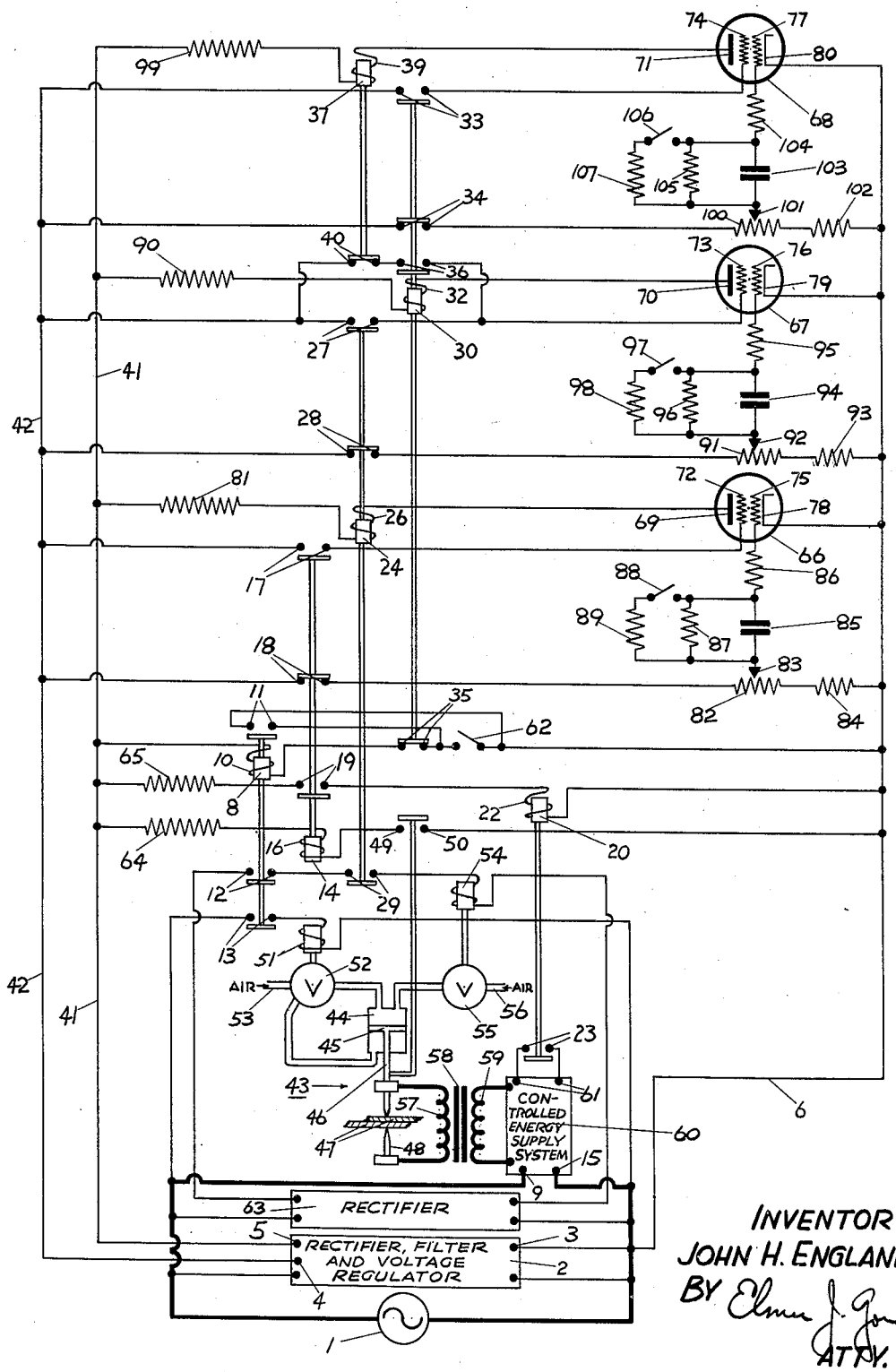

2,508,941

UNITED STATES PATENT OFFICE 2,508,941

ELECTRONIC TIMING CIRCUIT

John H. England, Wellesley Hills, Mass., assignor to Raytheon Manufacturing Company, Newton, Mass., a corporation of Delaware Application April 5, 1946, Serial No. 659,994

6 Claims. (Cl. 250—27)

This invention relates to electrical circuits, and more particularly to an electronic timing circuit for electric welding equipment.

An object of this invention is to devise an electronic timing circuit for electric welding equipment in which there is no necessity for a self-biasing circuit or a separate external source of bias to block the relay tubes.

Another object is to devise a novel electronic timing circuit in which the relay tubes are controlled by a variation of their screen grid potentials.

The foregoing and other objects of the invention will be best understood from the following description of an exemplification thereof, reference being had to the accompanying drawing, wherein the single figure is a diagrammatic representation of one means of carrying out the invention.

In the drawing, two pieces of work 47 are those to be welded with the system of this invention. These pieces are placed between upper and lower electrodes 46 and 48, respectively, of welding machine 43, which electrodes are connected to the terminals of secondary 57 of welding transformer 58. The primary 59 of said transformer is connected to the output terminals of a controlled energy supply system 60, the input terminals 9 and 15 of which are connected to a source of alternating current 1. Supply system 60 has two control terminals 61, and is arranged, in response to completion of a circuit between terminals 61, to supply electric current of a predetermined value, for a predetermined time, to the primary 59 of welding transformer 58, and hence also to the electrodes 46 and 48, to heat work 47 to welding temperature. Electrode 46 is movable vertically to provide pressure on work 47 to force the two pieces together with a predetermined force. Electrode 46 is mechanically connected to piston 45 movable in cylinder 44, said piston being moved upwardly or downwardly in response to the admission of compressed air into said cylinder from supply 53 or high-pressure supply 56 through valves 52 or 55, which are controlled by solenoids 51 and 54, respectively. Solenoid 51 so controls valve 52 that, when said solenoid is energized, valve 52 will be operated to admit air from supply 53 to the upper portion of cylinder 44, moving piston 45 and electrode 46 downwardly, while when said solenoid is deenergized, valve 52 will be operated to admit air from said supply to the lower portion of cylinder 44, moving piston 45 and electrode 46 upwardly. Solenoid 54, when energized, opens valve 55 to admit air from high-pressure supply 56 to the upper portion of cylinder 44, moving piston 45 and electrode 46 downwardly with increased pressure against work 47.

In welding with the system of this invention, the upper electrode must be forced against the work, and then the welding current applied to the work to heat it to welding temperature. A certain time after the welding current has been applied, while the welding current is still on and when the work has been heated to a predetermined temperature, a forging pressure must be applied to force the pieces of work together under an increased pressure. This requires a timing circuit, to time the period between the application of the welding current and the application of the forging pressure. A certain time after the forging pressure has been applied, the forging pressure must be released and the upper electrode moved away from the work, which requires a second timing circuit for this interval between the application of the forging pressure and the release of the forging pressure. A third time interval must be provided for the proper release of the forging pressure before the system is reset for the next operation, which requires a third timing circuit to establish this interval.

The source of alternating current 1 is connected to supply a rectifier 63 and also a rectifier, filter, and voltage regulator 2. Rectifier 2 is so arranged that between its output terminals 3 and 4 there is a potential difference of 105 volts D. C., and a difference of 220 volts D. C. between output terminals 3 and 5. Conductor 6 is connected to output terminal 3 to serve as the common or grounded lead of the system, said conductor also being connected to one of the leads from source 1. Lead 41 is connected to 220-volt terminal 5 and lead 42 is connected to 105-volt terminal 4. The operating winding 10 of relay 8 is connected across leads 41 and 6 in series with switch 62 and the normally-closed contacts 35 of relay 30. Switch 62 is ordinarily foot-operated, and closure of the same will energize relay 8. Normally-open contacts 11 of relay 8 are connected in shunt with switch 62, to provide a holding circuit to maintain relay 8 energized after it has been first energized by operation of switch 62. Solenoid 51 is connected in series with normally-open contacts 13 of relay 8 across source 1, so as to be energized when relay contacts 13 are closed by energization of relay 8. When solenoid 51 is energized by closure of contacts 13, valve 52 will be opened to supply air from source 53 into the upper end of cylinder 44, forcing piston 45 and upper electrode 46 downwardly.

Operating winding 16 of relay 14 is connected in series with resistor 64 and contacts 49 and 50 across the source leads 6 and 41. Contacts 49 and 50 are arranged to be closed by a member carried by upper electrode 46, in such a way that when upper electrode 46 has moved a predetermined distance, said contacts will be closed to complete a circuit through winding 16 of relay 14, energizing said relay. Operating winding 22 of relay 20 is connected across source leads 6 and 41, in series with normally-open contacts 19 of relay 14, and a resistor 65. Relay 20 is arranged to have a time delay between the time that it is energized and the time that its normally-open contacts 23 close, to insure that the application of welding current to the electrodes will be delayed somewhat to allow for the mechanical time delay of the electrode moving equipment. Contacts 23 of relay 20 are connected to control terminals 61 of the controlled energy supply system 60, in such a way that a circuit will be completed between said terminals 61 when relay 20 is energized. When relay 20 is energized, therefore, a welding current will be supplied to the electrodes 46 and 48.

As stated above, a time interval must be provided between the application of the welding current and the application of the forging pressure. This time interval is established through the use of tube 66 and its associated circuit elements. The three time intervals, which, as stated above, are required for the exercise of this invention, are provided by tubes 66, 67, and 68, respectively. These tubes, in cooperation with their associated circuit elements, provide the timing circuits. The operation of the fundamental timing circuit, consisting of tube 66 and its associated circuit elements, will now be described. Tubes 67 and 68, with their associated circuit elements, operate in essentially the same manner as this fundamental timing circuit. Tube 66 includes anode 69, screen grid 72, control grid 75, and cathode 78. Anode 69 is connected, through control winding 26 of relay 24 and resistor 81, to lead 41. Screen grid 72 is connected, through normally-open contacts 17 of relay 14, to lead 42. Cathode 78 is connected directly to common lead 6. Resistor 82, having a movable tap 83 thereon, is connected, in series with resistor 84 and with normally-closed contacts 18 of relay 14, across the source leads 42 and 6. Movable tap 83 is connected, through condenser 85 and resistor 86, to control grid 75 of tube 66. Resistor 87 is connected in shunt with condenser 85, while another circuit, comprising a resistor 89 and a switch 88 in series, is also connected in shunt with condenser 85. Since contacts 17 of relay 14 are normally open, the screen grid 72 is "floating," that is, it is not connected to anything. Under these conditions the tube 66 is non-conducting, since it has been found that when the screen grid of such a tube as 66 is "free," the tube will be non-conducting. It has been found, also that when such a tube is in a conducting state, due to a sufficiently small negative bias on the control grid and to a sufficient positive potential on the screen grid, it may be rendered non-conducting by the mere removal of the positive potential from the screen grid. Originally, contacts 18 of relay 14 are closed, so that resistor 82 and tap 83 provide a potentiometer, the upper end of which is connected to the 105-volt lead 42 and the lower end of which, through resistor 84, is connected to the cathode 78. Originally, therefore, control grid 75 is positive relative to its cathode 78 when condenser 85 is discharged. Grid or timing condenser 85 will therefore be charged by means of grid rectification in tube 66, to a value of voltage depending on the setting of tap 83 on potentiometer 82, and will be maintained charged as long as contacts 18 are closed. Fixed resistance 84 is provided to limit the minimum charge on condenser 85. Condenser 85 is charged by grid rectification in such a direction that the potential of control grid 75 goes beyond plate current cut-off in the negative direction, that is, the potential of control grid 75 goes negative with respect to its cathode when the contacts 18 are opened.

Relay 14 is of the type in which, when it is energized, the normally-closed contacts 18 are opened slightly before the normally-open contacts 17 are closed. When relay 14 is energized, contacts 18 are opened, thereby disconnecting the positive potential which was applied between the grid and the cathode, driving the grid 75 negative with respect to cathode 78 and also disconnecting the source which keeps condenser 85 charged, so that it begins to discharge through shunt resistor 87, thereby reducing the negative bias on control grid 75. When contacts 17 of relay 14 are closed due to energization of said relay, the screen grid circuit is closed so that a positive potential of 105 volts is applied to screen grid 72. However, this merely tends to cause tube 66 to conduct, and it will not conduct sufficient current to operate relay 24 in its plate circuit until the condenser 85 is discharged sufficiently to reduce the negative bias on control grid 75 to the proper low value. It will be observed that the condenser voltage is the only voltage present in the control grid circuit after the normally-closed contacts 18 open.

With the values of the condenser 85 and discharge resistor 87 fixed, the time interval between the energization of relay 14 and the energization of relay 24 is determined by the position of tap 83. Other timing values can be secured by changing the values of condenser 85 and discharge resistor 87. By means of switch 88 and resistor 89 across the timing condenser 85, two ranges of timing can be secured.

When relay 14 is deenergized, contacts 17 are opened to remove the screen grid voltage from tube 66, rendering it non-conducting and deenergizing relay 24 in its plate circuit. Contacts 18 are closed when relay 14 is deenergized, to again connect the source to condenser 85, thereby again charging it and maintaining it charged by means of grid rectification in tube 66, and thus preparing the timing circuit for another operation.

Solenoid 54 is connected, in series with normally-open contacts 29 of relay 24 and normally-open contacts 12 of relay 8, across the D. C. output of rectifier 63. Therefore, when relay 24 is energized at the end of the time interval above mentioned, solenoid 54 will be energized due to the closure of contacts 29 of relay 24 and due to the prior closure of contacts 12 of relay 8, which has previously been energized and which is maintained energized by its holding circuit comprising contacts 11 thereof. When solenoid 54 is energized, valve 55 will be opened to allow air from high-pressure air supply 56 to be admitted to the upper end of cylinder 44, thereby forcing piston 45 and upper electrode 46 downwardly with an increased pressure.

This increased pressure is termed the forging pressure. Prior to the application of this increased pressure, closure of contacts 23 of relay 20 has caused the welding current to be supplied from system 60 to the welding electrodes 46 and 48, thereby heating work 47.

A second timing circuit, consisting of tube 67 and its associated circuit elements, is provided to determine a time interval between the application of the forging pressure and the release of the forging pressure and of the initial pressure provided by the energization of solenoid 51 upon the work. Tube 67 includes an anode 70, a screen grid 73, control grid 76, and a cathode 79, said cathode being connected to common lead 6 of the system. Anode 70 is connected, through control winding 32 of relay 30 and a resistor 90, to lead 41. Screen grid 73 is connected, through normally-open contacts 27 of relay 24, to lead 42. A series circuit, comprising normally-closed contacts 28 of relay 24, a resistor 91 having a movable tap 92 thereon, and a resistor 93, is connected across leads 6 and 42 of the system. Screen grid 73 is also connected to lead 42 by a circuit including, in series, normally open contacts 36 of relay 30 and normally-closed contacts 40 of relay 37.

Movable tap 92 is connected, through condenser 94 and resistor 95, to control grid 76 of tube 67. Resistor 96 is connected in shunt to condenser 94, while a series circuit, comprising resistor 98 and switch 97, is also connected in shunt to said condenser. The operation of this timing circuit is substantially the same as that of the timing circuit previously described, so the description will not be repeated. A certain time after the energization of relay 24 to open its contacts 28 and close its contacts 27, relay 30 will be energized due to the fact that tube 67 is rendered conducting.

A third timing circuit, consisting of tube 68 and its associated circuit elements, is provided. Tube 68 includes an anode 71, a screen grid 74, a control grid 77, and a cathode 80, said cathode being connected to common lead 6 of the system. Anode 71 is connected, through control winding 39 of relay 37 and a resistor 99, to lead 41. Screen grid 74 is connected, through normally-open contacts 33 of relay 30, to lead 42. A series circuit, comprising normally-closed contacts 34 of relay 30, a resistor 100 having a movable tap 101 thereon, and a resistor 102, is connected across leads 6 and 42. Movable tap 101 is connected, through a condenser 103 and a resistor 104, to control grid 77. Connected across condenser 103 is a resistor 105. Also connected across said condenser 103 is the series combination of a switch 106 and a resistor 107. This timing circuit operates substantially the same as the timing circuit 66, etc., hereinbefore described, so that the description of the operation will not be repeated. A certain time interval after the energization of relay 30, which closes its contacts 33 and opens its normally-closed contacts 34, relay 37 will be energized to open its normally-closed contacts 40. It will be seen that the shunt circuit from lead 42 to screen grid 73, through contacts 40 of relay 37 and contacts 36 of relay 30, provides in effect a holding circuit, since it maintains a positive screen grid potential on screen grid 73, even though contacts 27 have previously been opened by the deenergization of relay 26. This shunt circuit will be maintained completed after the energization of relay 30 and the closing of its contacts 36, until the energization of relay 37 and the opening of its contacts 40.

To put the systems into operation, foot-operated switch 62 is closed. This causes relay 8 to be energized, since the contacts 35, in series with the operating winding 10 thereof, are normally closed. Closure of contacts 13 by the energization of relay 8 causes the energization in turn of solenoid 51, thereby admitting air to the upper end of cylinder 44 and moving piston 45 and upper electrode 46 downwardly on the work. When electrode 46 has moved downwardly a certain distance, contacts 49 and 50 are closed, completing a circuit through operating winding 16 of relay 14 and energizing said relay. Closure of contacts 19 of relay 14 causes, after a time delay, energization of relay 20, closing its contacts 23, which completes a circuit between the two control terminals 61 of supply system 60, to supply welding current to the electrodes 46 and 48. Energization of relay 14 establishes the beginning of the time interval determined by tube 66 and its associated circuit elements, at the end of which interval relay 24 is energized.

When relay 24 is energized, the closure of its contacts 29 completes a circuit to the forge solenoid 54, thereby controlling valve 55 to admit air from the high-pressure air supply 56 to the upper end of cylinder 44, thereby forcing piston 45 and upper electrode 46 downwardly with the increased forging pressure.

Energization of relay 24 also begins the second time interval, determined by tube 67 and its associated circuit elements, at the end of which interval relay 30 is energized. Relay 24, as is also the case with relays 14 and 30, establishes the beginning of the time interval by the opening of its contacts 28 which are in series with the grid potentiometer of the following tube, and by the closure of its contact 27 which are in series with the potential source and the screen grid 73 of the following tube.

When relay 30 is energized, normally-closed contacts 35 thereof will be opened. Opening of contacts 35 will cause deenergization of relay 8, because said contacts are in series with the operating winding 10 thereof. Opening of contacts 13 of relay 8 will deenergize solenoid 51, thereby admitting air to the lower end of cylinder 44, and moving piston 45 and upper electrode 46 upwardly. Opening of contacts 12 of relay 8 will cause deenergization of solenoid 54, thereby closing valve 55 and releasing the forging pressure. When upper electrode 46 has travelled upwardly a certain distance, contacts 49 and 50 will be separated, thereby deenergizing relay 14. Deenergization of relay 14 will, by opening of its contacts 19, cause deenergization of relay 20. Deenergization of relay 20 will, by opening of its contacts 23, reset the control circuit for supply system 60. When relay 14 is deenergized, opening of its contacts 17 will remove the positive potential from screen grid 72 of tube 66, thereby cutting off said tube and deenergizing relay 24. Closure of contacts 18 of relay 14 reconnects the source to condenser 85, thereby completing the charging circuit for said condenser.

Deenergization of tube relay 24 causes opening of contacts 27 and 29, and closure of contacts 28. Opening of contacts 27 tends to remove the positive potential from screen 73, and would cut off tube 67 and deenergize tube relay 30 were it not for the shunt circuit including contacts 36 and 40, which maintains the positive potential on screen 73 as long as said shunt circuit is completed. Closure of contacts 28 reconnects the source to condenser 94, tending to start recharging said condenser. Opening of contacts 29, contacts 12 having already been opened, prepares the forge solenoid circuit for the next operation.

When the third time interval, as set by the values of condenser 103, resistor 105 and/or 107, and by the position of tap 101, has elapsed, tube relay 37 will be energized, thereby opening normally-closed contacts 40 thereof. Relay 37 will remain energized as long as positive potential is on screen grid 74 of tube 68. The shunt circuit, including contacts 36 and 40, from the source to screen 73 of tube 67, is provided to insure that tube 67 will be maintained conducting, thereby maintaining relay 30 energized, long enough to span the third time interval and allow energization of relay 37. Opening of contacts 40 will, assuming relay 24 has already been deenergized to open contacts 27 (which is ordinarily the case), remove the positive potential from screen grid 73 of tube 67, thereby cutting off said tube to deenergize tube relay 30.

Deenergization of relay 30 will cause opening of its contacts 33 and 36, and closure of its contacts 34 and 35. Opening of contacts 33 will remove the positive potential from screen grid 74 of tube 68, thereby cutting off said tube and deenergizing relay 37 to reclose contacts 40, thereby preparing said relay and the circuit controlled thereby for the next operation. Closure of contacts 34 will connect the source to timing condenser 103, completing a charging circuit therefor. Closure of contacts 35 will condition the energizing circuit of relay 8 for the next operation, while the opening of contacts 36 will condition the shunt circuit to screen 73 for the next operation. The next operation, as before, may thereafter be initiated by the closing of switch 62.

It will be seen that tubes 66, 67, and 68, together with their respective associated circuit elements, provide the three separately adjustable time periods hereinabove referred to. The first time period, that produced in the input of tube 66, may be termed the forge delay time, since when relay 24 is energized at the end of this time period, the circuit to forge solenoid 54 is completed through contacts 29 of this relay. The second time period, that produced in the input of tube 67, may be termed the hold time, since at the end of this period relay 30 is energized to open contacts 35, deenergizing relay 8 and head solenoid 51 to start moving the electrode 46 upwardly. The third time period, that produced in the input of tube 68, may be termed the reset time, since at the end of this period relay 37 is energized to open contacts 40, thereby resetting or deenergizing relays 30 and 37 in turn.

Of course, it is to be understood that this invention is not limited to the particular details described above, as many equivalents will suggest themselves to those skilled in the art. For example, if desired the screen grids of the tubes may be connected to their cathodes through resistors of high value rather than being left "free." Various other variations will suggest themselves. It is accordingly desired that the appended claims be given a broad interpretation commensurate with the scope of this invention within the art.

What is claimed is:

1. A timing circuit including, in combination, an electron discharge tube having at least anode, cathode, control grid and screen grid elements, a source of potential, means connecting the anode-cathode path of said tube in series with a device to be operated across said source, a condenser having one terminal connected to said control grid and its other terminal connected to an intermediate tap on a potentiometer across said source, whereby said condenser charges by grid rectification in said tube and whereby said control grid is biased negatively due to said condenser charge when said potentiometer is disconnected from said source, switching means operative at a predetermined instant to disconnect said potentiometer from said source and to thereby allow said condenser to discharge and switching means operable with said last-named means for applying a positive potential from said source to said screen grid to allow said tube to conduct.

2. A timing circuit including, in combination, an electron discharge tube having at least anode, cathode, control grid and screen grid elements, a source of potential, means connecting the anode-cathode path of said tube in series with a device to be operated across said source, a condenser having one terminal connected to said control grid and its other terminal connected to an intermediate tap on a potentiometer across said source, whereby said condenser charges by grid rectification in said tube and whereby said control grid is biased negatively due to said condenser charge when said potentiometer is disconnected from said source, a discharge circuit across said condenser, a pair of normally-closed contacts connected in series with said potentiometer, means operative at a predetermined instant to open said contacts to disconnect said potentiometer from said source and to thereby allow said condenser to discharge through said discharge circuit, a pair of normally-open contacts connected in series with said source and said screen grid for applying a positive potential from said source to said screen grid, and means operative to close said last-named contacts.

3. A timing circuit including, in combination, an electron discharge tube having at least anode, cathode, control grid and screen grid elements, a source of potential, means connecting the anode-cathode path of said tube in series with a device to be operated across said source, a condenser having one terminal connected to said control grid and its other terminal connected to an intermediate tap on a potentiometer across said source, whereby said condenser charges by grid rectification in said tube and whereby said control grid is biased negatively due to said condenser charge when said potentiometer is disconnected from said source, a relay having at least a pair of normally-closed contacts and a pair of normally-open contacts, means connecting said normally-closed contacts in series with said potentiometer, means connecting said normally-open contacts in series with the positive lead of said source and said screen grid, and means for energizing said relay to open said normally-closed contacts and to close said normally-open contacts.

4. A timing circuit including, in combination, an electron discharge tube having at least anode, cathode, control grid and screen grid elements, a source of potential, means connecting the anode-cathode path of said tube in series with the device to be operated across said source, means for applying a negative potential to said control grid, means for causing said negative potential to decrease with time from a predetermined instant, and a switch operable with said last-named means for applying a positive potential from said source to said screen grid to allow said tube to conduct.

5. A timing circuit including, in combination, an electron discharge tube having at least anode, cathode, control grid and screen grid elements, a source of potential, means connecting the anode-cathode path of said tube in series with a device to be operated across said source, a condenser connected to said control grid, a resistive circuit connected across said condenser, means for charging said condenser from said source by grid rectification in said tube, switching means operative at a predetermined instant for applying the condenser voltage alone across the control grid and cathode to bias said control grid negatively and for disconnecting said condenser from said source to allow said condenser to discharge through said resistive circuit, and switching means operable with said last-named means for applying a positive potential from said source to said screen grid to allow said tube to conduct.

6. A timing circuit including, in combination, an electron discharge tube having at least anode, cathode, control grid and screen grid elements, a source of potential, means connecting the anode-cathode path of said tube in series with a device to be operated across said source, a condenser connected to said control grid, a discharge circuit connected across said condenser, a relay having at least a pair of normally-closed contacts and a pair of normally-open contacts, means connecting said normally-closed contacts in series with said source and said condenser for charging said condenser by grid rectification in said tube, means connecting said normally-open contacts in series with the positive lead of said source and said screen grid, and means for energizing said relay to open said normally-closed contacts and to close said normally-open contacts, the opening of said normally-closed contacts applying the condenser voltage alone across the control grid and cathode to bias said control grid negatively and disconnecting said condenser from said source to allow said condenser to discharge through said discharge circuit, and the closing of said normally-open contacts applying a positive potential from said source to said screen grid to allow said tube to conduct.

JOHN H. ENGLAND.

REFERENCES CITED

The following references are of record in the file of this patent:

UNITED STATES PATENTS

| Number | Name | Date |
| --- | --- | --- |
| 2,292,846 | Pritchard | Aug. 11, 1942 |
| 2,347,826 | Heisner | May 2, 1944 |
| 2,364,680 | Wolfner | Dec. 12, 1944 |